United States Patent
Jerome

(10) Patent No.: US 6,250,091 B1
(45) Date of Patent: Jun. 26, 2001

(54) EFFICIENT STRUCTURE COOLING SYSTEM

(76) Inventor: George A. Jerome, 7121 Royer Ave., West Hills, CA (US) 91307

( * ) Notice: Subject to any disclaimer, the term of this patent is extended or adjusted under 35 U.S.C. 154(b) by 0 days.

(21) Appl. No.: 09/450,540

(22) Filed: Nov. 30, 1999

(51) Int. Cl.⁷ .................................................. F28D 3/00
(52) U.S. Cl. .............................. 62/171; 62/259.1; 62/304
(58) Field of Search .................................. 62/171, 259.1, 62/304, 121, 132, 56

(56) References Cited

U.S. PATENT DOCUMENTS

| | | | |
|---|---|---|---|
| 964,464 | * 7/1910 | Crawford-Frost | 62/304 |
| 1,808,829 | 6/1931 | Branes et al. | |
| 1,936,732 | * 11/1933 | Renard | 62/304 |
| 2,069,150 | 1/1937 | Holder et al. | 299/141 |
| 2,266,321 | 12/1941 | Holder et al. | 62/6 |
| 2,337,710 | * 12/1943 | Cowan | 62/259.1 |
| 2,342,211 | * 2/1944 | Newton | 62/259.1 |
| 2,437,156 | * 3/1948 | Frick | 62/171 |
| 2,506,936 | 5/1950 | Murray et al. | 62/2 |
| 2,660,863 | 12/1953 | Gerhart et al. | |
| 2,727,366 | * 12/1955 | Hagen | 62/304 |
| 3,861,624 | 1/1975 | Lear et al. | 244/118 |
| 4,502,288 | * 3/1985 | Lynch | 62/171 |
| 4,761,965 | 8/1988 | Viner et al. | 62/171 |
| 5,588,303 | * 12/1996 | Parks | 62/171 |
| 5,598,719 | * 2/1997 | Jones et al. | 62/304 |
| 5,775,110 | * 7/1998 | Waldron | 62/259.1 |
| 5,797,274 | * 8/1998 | Jackaman et al. | 62/171 |
| 6,112,538 | * 9/2000 | Strussion | 62/304 |

* cited by examiner

Primary Examiner—Teresa Walberg
Assistant Examiner—Fadi H. Dahbour

(57) ABSTRACT

A method and apparatus for efficiently applying a thin film of water on a solar energy impacted surface, especially a building. By measuring the rate of evaporation, and the level of absorption of fluid by the surface, the apparatus applies fluid at appropriate times to achieve nearly 100% evaporation, thereby maximizing its cooling effects. The apparatus controls multiple control valves, each valve supplying fluid to one or more spray nozzles, thereby minimizing the need for excessively large water supply pipes.

45 Claims, 7 Drawing Sheets

CLOSED

OPEN

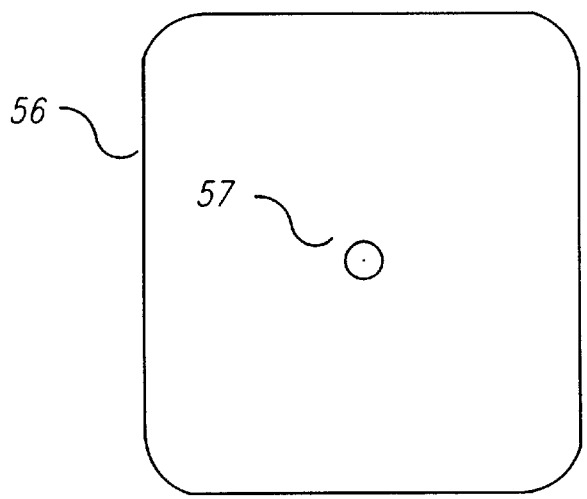
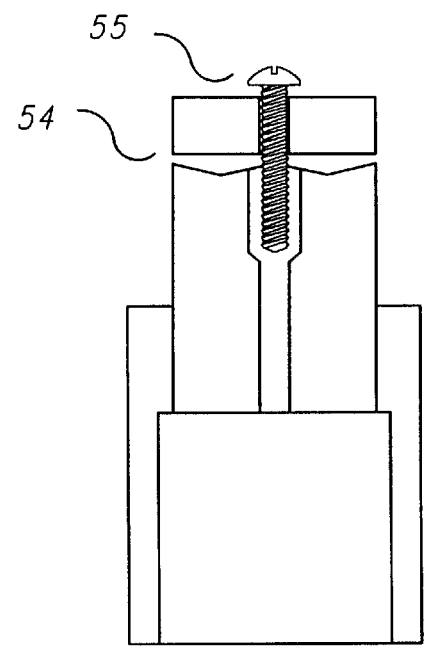
FIG. 5A    FIG. 5B
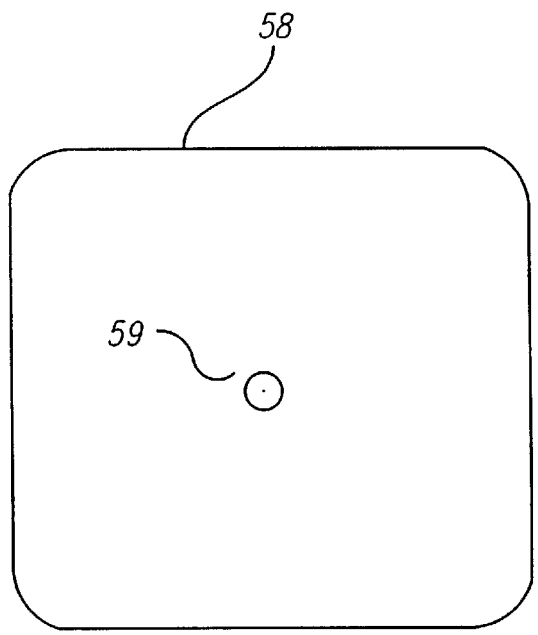
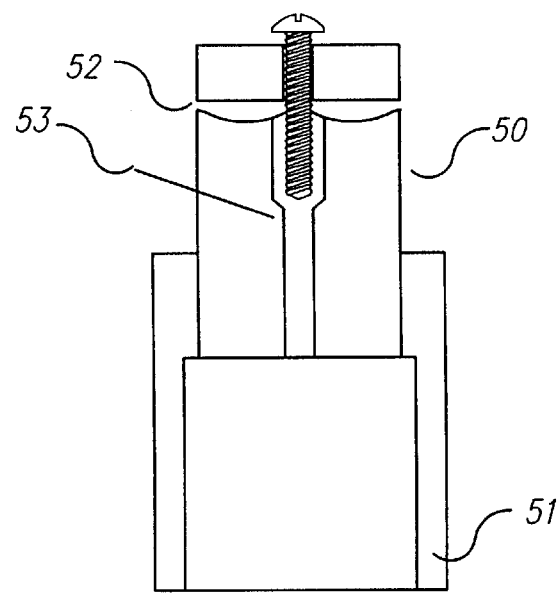
FIG. 6A    FIG. 6B

EFFICIENT STRUCTURE COOLING SYSTEM

BACKGROUND

1. Field of the Invention

This invention relates to cooling of buildings, particularly to cooling by efficient absorption and removal of heat from solar energy from the outer surfaces of buildings, thereby obviating the necessity of expensive and energy-wasting systems for removing such energy.

2. Description of the Prior Art

The desire and need to provide cooling for buildings and structures is as old as the art of constructing human habitation. We perceive "comfort" over a very narrow temperature range. Below about 18.35 degrees Celsius, the average person has the perception of cold. Above about 26.67 degrees Celsius the average person feels uncomfortably warm. From the very beginning, the concept of a habitable structure involved providing protection from the elements, including natural temperature variations beyond that which is comfortable.

From the earliest use of mud and leaves as insulation, humans have sought to perfect the environment by the use of habitats. For much of the time, the consumption of resources, and the use of power was secondary to the achievement of a controlled environment. The prior art clearly shows the desire for achievement of control, without significant consideration for the efficient use of resources.

The prior art is replete with examples of means and devices to control, or improve on, the control of a building's environment.

U.S. Pat. No. 2,266,321 to Holder (Dec. 16, 1941), addresses the "prevention of excessive heat accumulation in exposed surfaces such as roofs." Importantly, Holder recognizes that evaporative cooling efficiently removes energy, while the excessive application of fluid on the surface decreases the effect. In a previous U.S. Pat. No. 2,069,150, (xx-date) Holder described a piping and spray system using a continuously applied spray of water. By first describing a continuous water spray, then adding an interrupted spray, Holder improved upon a basic concept of using water for cooling purposes. Holder, while envisioning a thermostatically controlled valve to interrupt the flow of water, fails to contemplate the consequences of his own analysis.

Holder correctly describes the "initially high roof cooling efficiency" as water is initially applied to the roof surface. He then continues; "the action progressively and rapidly approaches the condition of low evaporative cooling efficiency wherein main reliance must necessarily be placed upon the cooling effect of the water per se." Holder then proceeds to describe a process wherein a valve is thermostatically controlled for the application of water to the roof. Unrecognized is the effect of pooled water, rising to the temperature that is required to turn the valve on, thereby applying more water on water. This is an effect already recognized as undesirable. Holder fails to assure that water is applied without the possibility of accumulating water on the surface. Under such condition, the accumulated water may not provide any cooling.

U.S. Pat. No. 2,506,936, to Murray (May 9, 1950) continues the refinement of the cooling process by first reiterating the correct statement; "If only a small amount of water is placed on the roof, the evaporation is highly accelerated as compared to what would be if the roof surface were flooded with water." Murray's solution is the addition of a time delay after a first application of water, until the next succeeding application of water. At this point, the concept fails in several respects. First, Murray describes a means of cooling the thermostat as water is applied to the roof If the thermostat is cooled by application of too great flow of water, the roof receives to little water. If the thermostat is too cooled by too little water, the roof receives too much water. In this procedure, the surface to be cooled is not directly sensed for the correct amount of water to achieve optimal cooling.

Some early concepts utilize novel, and highly inefficient means to reduce roof temperatures.

U.S. Pat. No. 1,808,829, to Barnes (Jun. 9, 1931), describes a water-absorbent material, such as burlap or canvas, soaked with water, to act as a barrier to the sun's energy. The potential for rot and mildew, as well as other technical difficulties, make this concept unacceptable for modern use.

U.S. Pat. No. 2,660,863, to Gerhart (Dec. 1, 1953), utilizes a porous hose to effectively drip-irrigate the roof. As in Barnes, the potential for rot and mildew precludes use of this concept.

U.S. Pat. No. 4,761,965, to Viner (Aug. 9, 1988) describes a very specific arrangement of an evaporative roof cooling system. Viner describes a "plurality of water distribution . . . nozzles, a "conduit means", a solenoid valve, and a "temperature measurement means comprising a thermistor". Viner, like his predecessors, espouses the need to apply water in a thin film, allow it to evaporate, then repeat the application. Also like his predecessors, Viner falls into the trap of presuming that a timed cycle of water on/ water off will achieve the goal of optimum application of water. This timed sequence will never account for the variations in temperatures, variations of the water absorption of the roof material, variation in relative humidity, wind factor, as well as other factors that impact not only the rate of cooling of the roof, but also the rate of evaporation. Consequently, Viner fails in his goal to apply an optimally thin film of water.

Viner boasts "electrical power usage for the system is essentially zero", but describes an electrically operated solenoid control valve, and rated for continuous duty. Viner neglects the power requirements of the valve, in addition to the costs associated with wiring the valve and control systems to the building wiring.

U.S. Pat. No. 3,861,624, to Lear (Jan. 21, 1975), describes an aircraft cabin comfort control system. Lear utilizes aircraft skin temperature to regulate the flow of conditioned air to the occupants of the aircraft. Lear utilizes the temperature of the aircraft to provide a control decision for temperature regulation.

None of the prior art, from Barnes (1931) through Viner (1988), takes into account the energy absorption of generally east-facing or west-facing vertical walls of a structure, another major source of heat energy resulting in the heating of a building. None of the prior art moves beyond the concept of either timed application of water, or application of water based on surface temperature, neither being a true means of assuring that full and complete evaporation is achieved.

OBJECTS AND ADVANTAGES

Accordingly one object of the present invention is to provide an improved system to intercept and remove, with maximum efficiency, by evaporation of a fluid, solar energy impinging upon a building or dwelling.

Another object is to deliver water to a surface only when the previously applied fluid has fully evaporated, and then shortly after complete evaporation has occurred. By assuring that fluid is applied to the surface in this manner, virtually all of the energy-of-evaporation of a fluid is utilized.

Another object is to maintain a high-humidity environment at the surface of the roof. By maintaining this humidity level at the sun-exposed surface of a roof, the materials of the roof are prevented from excessively drying out, thereby increasing the useable life of the materials.

Additionally, an object is to reduce the temperature of the roof and walls of a structure, thereby reducing the cost, in terms of dollars and resources, to maintain a building at a comfortable living and working level. By so doing, my system improves quality of life, and efficiency of work effort, without burdening the ecology of the area.

Another object is to reduce the size and cost of pipe by introducing fluid to portions of the structure at a time.

A further object is to prevent any system failure that could produce continuous flow of fluid to one or more sectors of the structure. In the event of detection of any failure that could cause continuous flow, the system is shut down, with an alarm feature activated.

BRIEF DESCRIPTION OF THE DRAWINGS

FIGS. 5A & 5B. are cross section views of a spray head used in the system, with a linear spray bias.

FIGS. 6A & 6B. are cross section views of a spray head used in the system, with a sine-wave spray bias.

Figure 1:
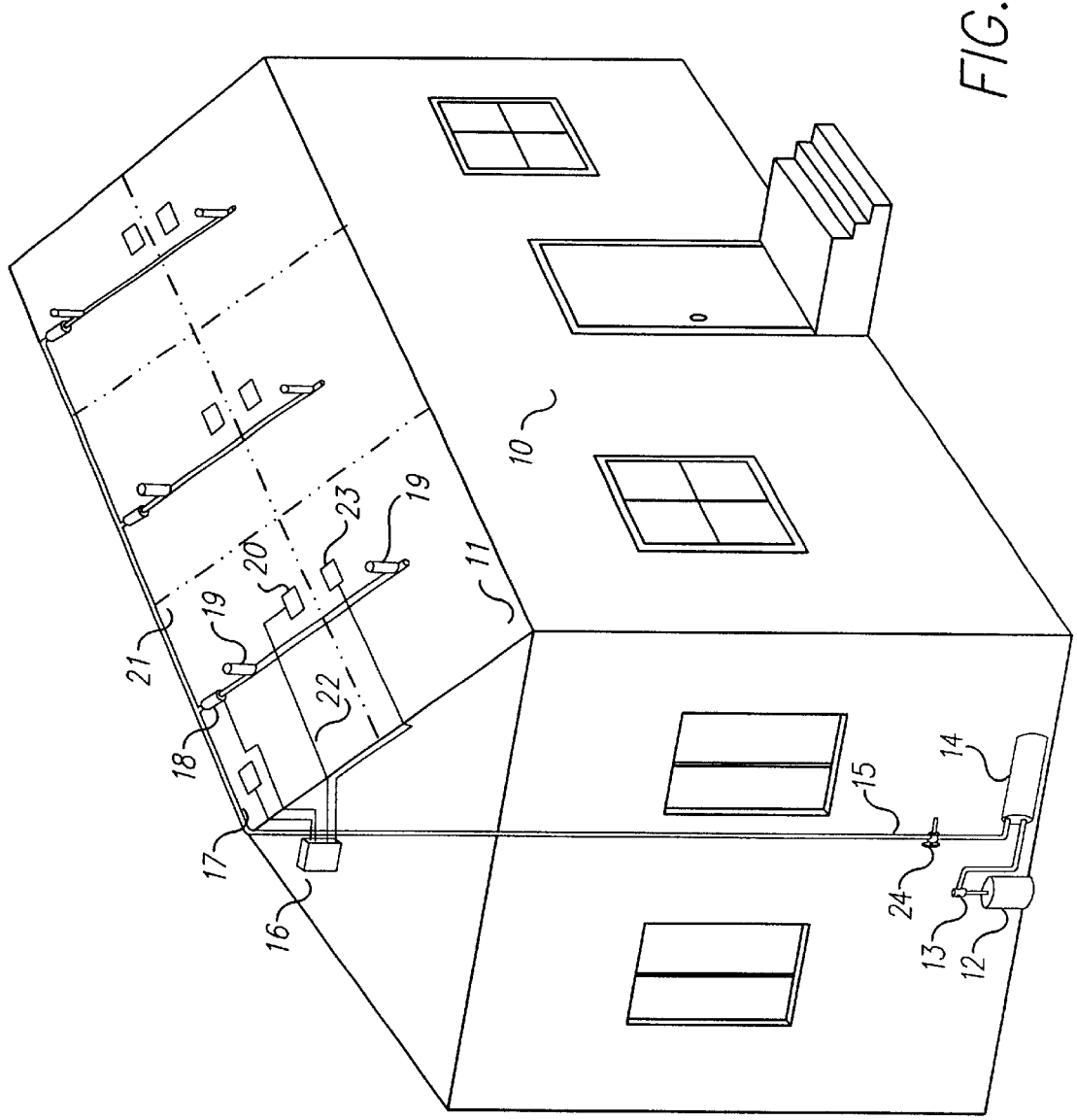
FIG. 1 is a perspective view of a building, primarily the system and roof components of an evaporative cooling system, installed in accordance with the invention.

| Reference Numerals | |
|---|---|
| 10 | Building or Structure |
| 11 | Roof |
| 12 | Water Pressure Regulator |
| 13 | On-Off Valve |
| 14 | Water Softener |
| 15 | Water Supply Pipe |
| 16 | Electronic Control System |
| 17 | Solar Panel |
| 18 | Roof Control Valve |
| 19 | Roof Spray Nozzle |
| 20 | Roof Temperature/Moisture Sensor |
| 21 | Roof Spray Pattern Boundary |
| 22 | Roof Electrical Connections |
| 24 | Drain Valve |
| 25 | Wall Control Valve |
| 26 | Wall Spray Nozzle |
| 27 | Wall Spray Boundary |
| 28 | Window Open Sensor |
| 29 | Sensor Electrical Wiring |
| 30 | Branch Water Supply Pipe |
| 31 | Wall Opening |

| -continued | |
|---|---|
| Reference Numerals | |
| 33 | Wall Temperature Sensor |
| 34 | Wall Moisture Sensor |
| 35 | Valve Housing |
| 36 | Upper Valve Housing |
| 37 | Valve Piston |
| 38 | Piston Connector |
| 39 | Piston Seal |
| 40 | Valve Inlet |
| 41 | Valve outlet |
| 42 | Valve Cylinder |
| 43 | Solenoid |
| 44 | Solenoid Discharge |
| 45 | Inlet Orifice |
| 46 | Outlet Orifice |
| 47 | Valve Seat |
| 50 | Spray Nozzle Body |
| 51 | Spray Nozzle Inlet |
| 52 | Non-Linear Nozzle Outlet |
| 53 | Nozzle Orifice |
| 54 | Linear Nozzle Outlet |
| 55 | Adjustment Screw |
| 56 | Linear Spray Pattern |
| 57 | Spray Pattern Center - Linear Pattern |
| 58 | Non-linear Spray Pattern |
| 59 | Spray Pattern Center - Nonlinear Pattern |
| 60 | Deflector |
| 61 | Operate/Test |
| 62 | Solar Panel Control |
| 63 | Clock |
| 64 | Opening Sensor |
| 65 | Multiplexer |
| 66 | Microprocessor |
| 67 | Valve Outputs |
| 68 | Temperature Sensor |
| 69 | Conductivity sensor |
| 70 | Sensor logic |
| 71 | Solar Panel |
| 72 | System Ground |
| 73 | Battery |
| 74 | Diode |
| 75 | System Initiation |
| 76 | Test/Operation/Fire Mode Selector |
| 77 | Sector Sequencer |
| 78 | Moisture Sensor Input |
| 79 | Temperature Sensor Input |
| 80 | Spray Control |
| 81 | Moisture Sensor Monitor |
| 82 | Temperature Sensor Monitor |
| 83 | Manual Sector Advance |
| 84 | Test Mode Display |
| 85 | Emergency Shut Off |
| 86 | Time Delay |

SUMMARY OF THE INVENTION

This invention is directed to a system and method of evaporatively cooling residential, commercial, and industrial buildings to remove solar energy before it can infiltrate the structure, thereby reducing the costs of maintaining comfortable living levels within the structure. The system comprises a network of water delivery pipes, an array of fluid spray nozzles, sensors for measuring temperature of roof or wall areas, sensors for measuring remaining moisture on the roof or wall areas, and electrical valves for applying water at appropriate intervals.

The array of nozzles is arranged to cover respective areas of a roof or wall such that only a small number of nozzles are in operation at any one time. This alleviates the need for large water delivery pipes. One control valve covers each designated area, each valve being controlled by separate temperature and moisture sensors. Thus, if one area of a roof or wall receives more or less solar energy, the system will deliver an appropriate amount of fluid to compensate for variations in solar energy coverage.

The nozzles comprising part of this system are designed to deliver an approximately square pattern, minimizing areas of multiple coverage and therefore excessive fluid coverage due to over spray of one area on another.

FIG. 1—Building With Evaporative Cooling System— Description

Building 10 (FIG. 1) represents any residential, commercial, industrial or business building or structure consisting of at least four walls and a roof 11. Roof 11 is a generally horizontal or inclined surface. Pressure regulator 12 connects to the structure's water mains. Regulator 12 generally reduces fluctuating pressure water from a city system to a steady pressure for residential or commercial use, preferably limiting the pressure to 50 PSI. The pressure must be increased about 5 PSI for each building story above two. Connected to the output side of regulator 12 is on-off valve 13. Valve 13, while generally a manually operated valve, may be a remotely controlled electrical valve. Drain valve 24 is connected between a water softener 14 and water supply pipe 15.

On-off valve 13 supplies, when in the "On" position, fluid supply to water softener 14. The output port of softener 14 is connected to water supply pipe 15, which in turn supplies fluid to a multiplicity of roof control valves 18. Each roof control valve 18 is connected through roof electrical connection 22 to a control system 16. Additionally, one sensor 20 for each control valve 18 is connected to control system 16. Solar panel 17 is connected to control system 16. The output side of each control valve 18 is connected, through water supply pipe 15, to a multiplicity of roof spray nozzles 19. Each spray nozzle 19, when supplied with fluid under pressure, provides a generally square spray pattern 21.

Roof 11 is divided into one or more sectors, each containing one roof control valve, one temperature sensor 20, one moisture sensor 23, and one or more roof spray nozzles 19.

FIG. 1—Building with Evaporative Cooling System Installed—Operation

The system of FIG. 1 is generally initiated by water pressure supplied at the input side of regulator 12. Regulator 12 limits the maximum fluid pressure available to the system to a maximum design limit. The output side of regulator 12 is connected to system on-off valve 13, thereby enabling the system to be turned off during periods on non-use, or emergency. When "on", valve 13 supplies fluid under pressure to water softener 14. Generally, softener 14 is required to remove excess minerals, given that some geographical areas have municipal water containing mineralizaton which, when applied to the roof and allowed to evaporate, will leave a white- or light-colored stain on the roof material. This white stain is minimized by use of water softener 14. The output side of softener 14 supplies water supply pipe 15 with fluid under pressure. Pipe 15 is connected to the input side of each of a multiplicity of roof control valves 18.

Temperature sensors 20—one for each sector—measure the temperature of the surface of its respective of the roof Moisture sensor 23—one for each sector—measures the unevaporated, or absorbed fluid of its respective portion of the roof. If a temperature sensor 20 senses a temperature above the desired temperature trigger point, e.g. 28° C., AND moisture sensor 23 measures no more than a predetermined level of absorbed, unevaporated fluid (as measured by the conductivity of the surface) a positive signal goes to the appropriate sector input of control system 16. An appropriate conductivity for triggering the system is 5,000 ohms, measured across two probes mounted 1.6MM to 3.2MM apart on the surface. To insure reliability, more than one set of probes may be used, where the average conductivity, or the mean conductivity is used as the measurement. For each sector in sequence, if a positive signal is received from combined sensors 20 and 23, control system 16 applies power to an appropriate sector control valve 18, thus turning on that valve.

When one of the control valves 18 is on, fluid under pressure is supplied through water supply pipe 15 to one or more roof spray nozzles 19. When pressure is applied, each spray nozzle 19 supplies an approximately square pattern of water over a portion of roof 11, as shown by roof spray pattern limits 21. Control system 16 continues the application of water for a particular sector for a period of time determined by the value of the input to moisture sensor 23, then turns off power to valve 18. Upon turn-off of one control valve 18, control system 16 then sequences to the next sector, sensing the input from that sector's temperature sensor 20 and moisture sensor 23.

During periods of freezing temperatures, water supply pipes 15 can be drained of water, by activating drain valve 24, opening pipes 15 to the atmosphere near ground level. This prevents damage to these pipes due to expansion of freezing water.

Figure 2:
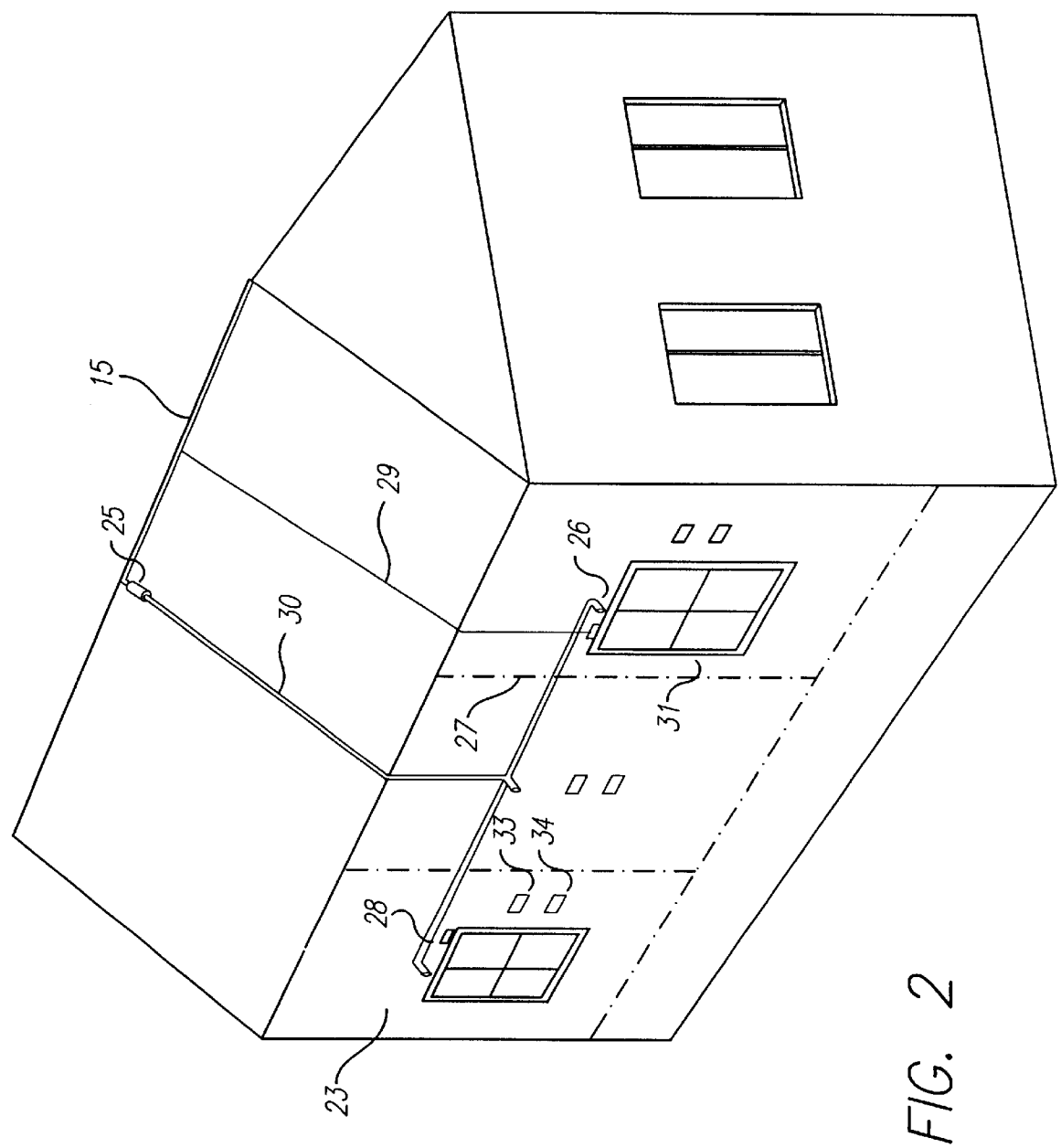
FIG. 2 is a perspective view of a building, primarily the system and wall components of an evaporative cooling system, installed in accordance with the present invention.

FIG. 2—Building with Evaporative Cooling System— Description

FIG. 2 depicts substantially the same system of FIG. 1, showing the components primarily associated with the vertical walls of building 10, instead of the roof 11. Primarily, the difference between the components depicted in FIG. 1 and those of FIG. 2 are the inclusion in FIG. 2 of window open sensors 28.

FIG. 2—Building with Evaporative Cooling System— Operation

As shown in FIG. 1, pipe 15 delivers fluid to various components of the system. In particular, pipe 15 delivers fluid to wall control valve 25, or to a multiplicity of wall control valves 25. Generally, this part of the system is desirable for all east or west facing vertical walls—those walls receiving a substantial input of solar energy.

Valve 25, when energized by control system 16, permits delivery of fluid under pressure to wall spray nozzles 26. As previously described, control system 16 receives an input from each sector's temperature sensor 20 and moisture sensor 23 to determine the necessity, or lack thereof, to energize a sector's control valve 18.

For those sectors associated with vertical walls 32, an additional factor is required. For those walls 32 which contain one or more openings, such as such as windows 31, the water should not be allowed to intrude upon structure 10 if opening 31 is not sealed or closed. Wall opening sensor 28 detects whether opening 31 is in an open or closed state, transmitting this information by means of electrical wiring 29 to control system 16. As each sector is evaluated for application of fluid, sensor 28 precludes introduction of fluid upon a wall sector 32 if any opening 31 is not closed.

It is well established that one gallon of water, upon evaporating, absorbs 8,265 Btu of heat. By the application of a thin film of water to a surface, allowing all of the water to evaporate before a subsequent application, it may be expected that 8,265 BTUs of heat energy are removed for each gallon of water applied to the surface.

Figure 3:
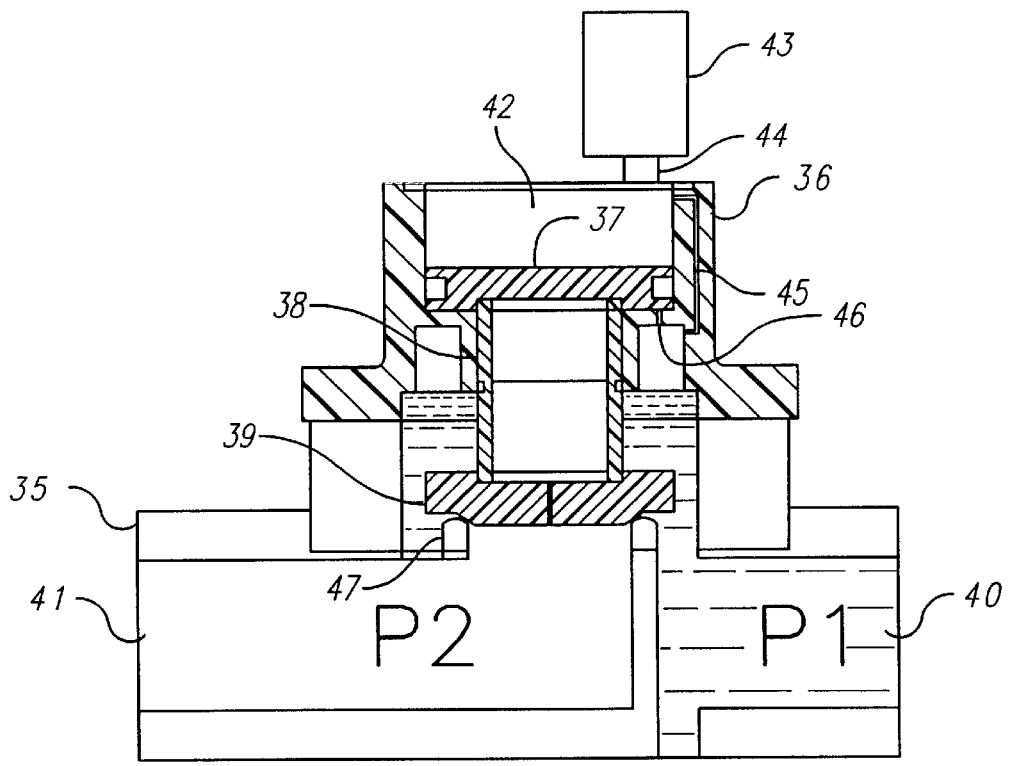
FIG. 3 is a cutaway view of a control valve used in the system; shown in an open position.

FIG. 3—Control Valve—Closed Position—Description

FIG. 3 generally represents a cross sectional view of control valve 18. Attached to a housing 35 of the control valve is an upper control valve housing 36. Contained within upper housing 36 is a piston 37, a piston connector 38, a piston seal 39, and a valve cylinder 42. Mounted atop upper valve housing 36 is solenoid 43. Part of upper control valve housing 36 is orifice 44. Part of housing 35 is a valve inlet 40, and a valve outlet 41.

FIG. 3—Control Valve—Closed Position—Operation

A portion of control valve housing 35, valve inlet 40, is connected to the outlet side of regulator 12 through pipe 15. This provides fluid under pressure to control valve 18. The fluid pressure P1 of valve inlet 40 is essentially the same as the pressure at the outlet of water regulator 12, e.g. 50 PSI. This pressure is bled through orifice 45 to valve cylinder chamber 42. The pressure in valve cylinder chamber 42 moves assembly piston 37, piston connector 38, and piston seal 39 to its bottom position against valve seat 47. Piston seal 39 presses against valve seat 47 to close valve outlet 41 to pressure from valve inlet 40, thereby reducing the pressure to P2, i.e. to essentially zero. Outlet pressure P2, being zero, causes inlet pressure P1 to press valve seal 39 further against valve seat 47, closing valve 18 to fluid transfer from valve inlet 40 to valve outlet 41. Control valve 18 remains closed until opened by solenoid 43.

Figure 4:
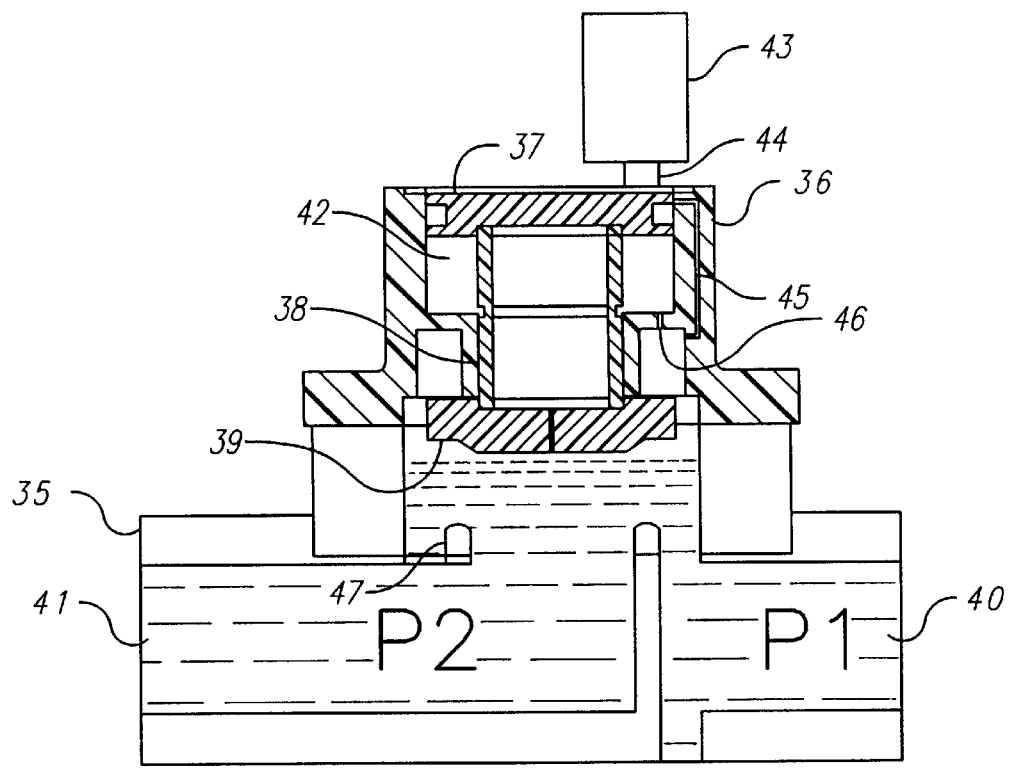
FIG. 4 is a cutaway view of control valve used in the system, shown in a closed position.

FIG. 4—Control Valve—Open Position—Description

FIG. 4 shows the control valve 18 in its fully open state. The relative location of the assembly consisting of valve piston 37, piston connector 38, and piston seal 39 relative to valve seat 47 are now fully retracted into upper valve housing 36.

FIG. 4—Control Valve—Open Position—Operation

Upon activation of solenoid 43, pressure in valve cylinder 42 is reduced through solenoid discharge orifice 44. As pressure in valve cylinder 42 reduces, valve piston 37 is forced upward by pressure introduced to the underside of valve cylinder 42 through outlet orifice 46. As valve piston 37 moves off valve seat 47, pressure at level P1 is introduced through valve seat 47 to valve outlet 41. Pressure at level P2 now becomes a positive value, e.g. 30 to 40 PSI, and fluid flows from valve inlet 40, through valve seat 47 to valve outlet 41.

After closure of solenoid 43 further bleed of fluid through solenoid discharge orifice 44 is stopped. Fluid now bleeds through orifice 45, increasing pressure in the portion of cylinder 42 above the piston. Piston 37 now moves downward until the conditions of FIG. 3 are met, i.e. valve seal 39 is again sealed against valve seat 47, pressure P2 is reduced to zero, and the valve is closed. By such design, the valve is opened by a momentary application of power to solenoid 43, beginning a timed closure without any further disturbances. In the event of loss of power, or failure of control system 16, the valve automatically closes, preventing unwanted spillage of water.

FIG. 5—Cross Sectional View of Spray Head with Linear Outlet—Description

FIG. 5 generally depicts a cross sectional view of spray nozzle 19. Spray nozzle 19 consists of spray nozzle body 50, and spray nozzle inlet 51. Deflector 60, is attached to spray nozzle body 50 by means of an adjustment screw 55. Spray nozzle body 50 is connected to pipe 15 by means of spray nozzle inlet 51.

FIG. 5—Cross Sectional View of Spray Head with Linear Outlet—Operation p When fluid pressure is applied to spray nozzle 19 through spray nozzle inlet 51, fluid is introduced from spray nozzle inlet 51, through nozzle orifice 53 to linear nozzle outlet 54. Fluid introduced through nozzle orifice 53 impinges on deflector 60, spraying fluid tangentially away from the central axis of spray nozzle body 50. Linear Spray pattern 56 is established by the thus created radial gap between linear nozzle outlet 52 and deflector 60.

FIG. 6—Cross Sectional View of Spray Head with Non-Linear Outlet—Description

FIG. 6 generally depicts a cross section view of spray nozzle 19. This embodiment is substantially the same as that of FIG. 5 except that outlet 52 is non-linear so as to achieve spray patterns 58 other than a substantially square pattern. This non-square spray pattern is required for areas that, after optimally placing square pattern spray heads, contain areas of non-square dimension not covered by the square spray heads.

FIG. 6—Cross Section View of Spray Head with Non-Linear Outlet—Operation

FIG. 6 generally depicts the same spray nozzle 19 as FIG. 5, with spray nozzle outlet 52 replacing linear spray nozzle 54 to achieve other than a square spray pattern 58.

Figure 7:
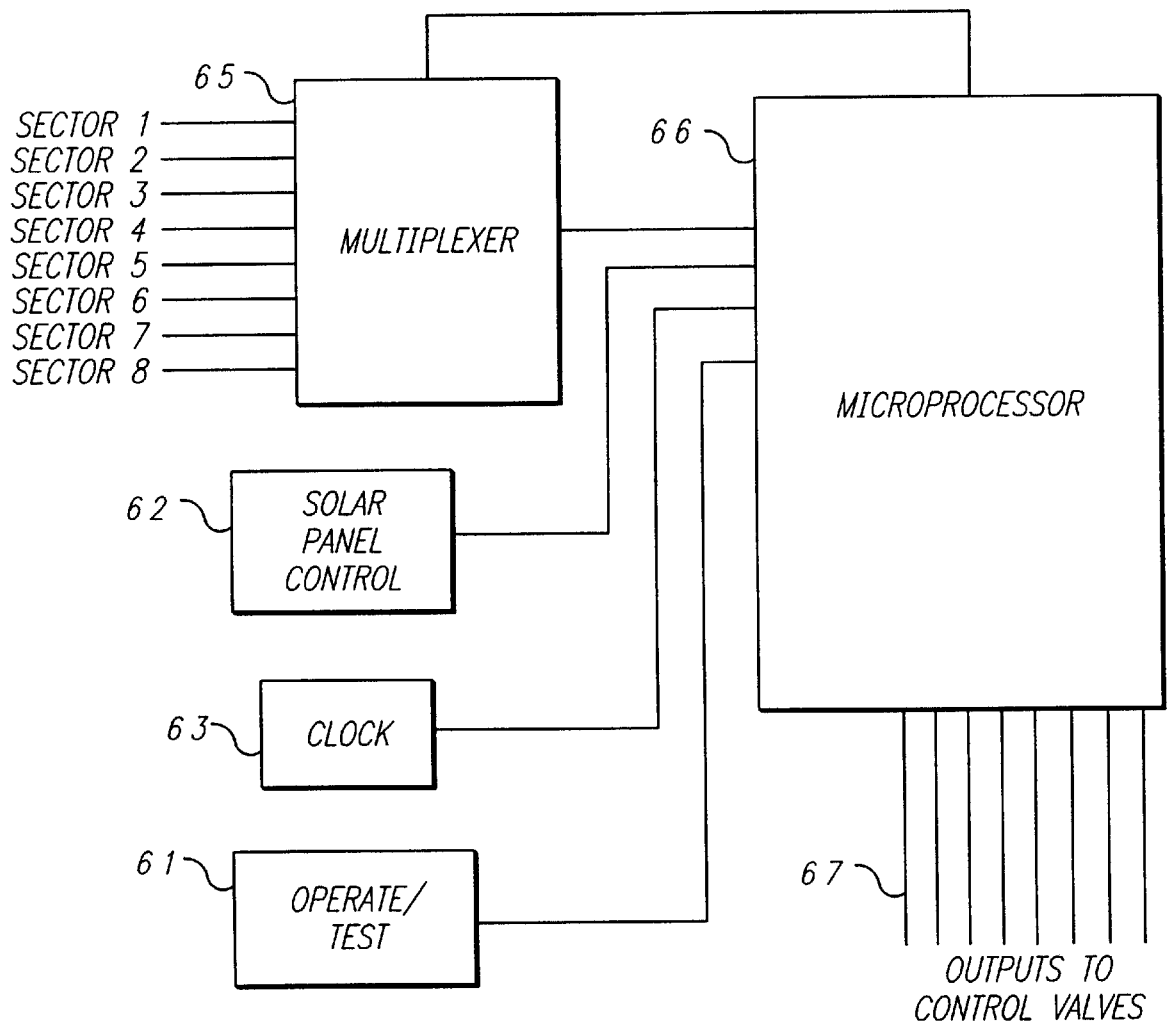
FIG. 7. is a block diagram of the control system.

FIG. 7—Block Diagram of Control System—Description

FIG. 7 generally depicts a block diagram of the control system schematic functions. Microprocessor 67 connects to all system components; multiplexer 65, solar panel control 62, system clock 63, operate/test 61, and valve outputs 67.

FIG. 7—Block Diagram of Control System—Operation

System clock 63 provides the basic cadence for system operation. At each pulse output from clock 63, the program of microprocessor 66 advances one step. Microprocessor 66 sets the active sector for multiplexer 65 for each step of the program. Multiplexer 65 connects to all sectors, selecting the appropriate sector as set by microprocessor 66.

An operate/test unit 61 sets microprocessor 66 into either operate mode, or test mode. Operate mode is selected for normal operation of the system. The test mode is selected to calibrate operating set points, or to step from sector to sector when a pipe 15 has a drain sequence. This sequence is required for system shutdown when freezing may occur.

Solar panel control 62 provides an input to microprocessor 66 which in turn instructs microprocessor 66 to operate or "sleep." During daylight time, solar panel 71 (FIG. 9) converts solar energy impinging the surface of the panel into electrical energy, which charges battery 73. During evening and night hours, solar panel 71 is receiving solar energy, and therefore is not generating electrical energy to recharge battery 73. During periods where there is insufficient solar energy to charge battery 73, there is no need to operate the system. During these hours, microprocessor 66 is placed into "sleep" mode—a very low power standby status. As daylight comes, the level of solar energy increases, increasing the solar-to-electrical energy conversion inherent in solar panels, permitting solar panel 71 to generate recharging power for battery 73. Microprocessor 66 is "awakened" from its sleep mode and returned to normal operation.

Microprocessor 66, upon receiving signals from multiplexer 65, activates outputs 67 to operate control valve 18.

Figure 8:
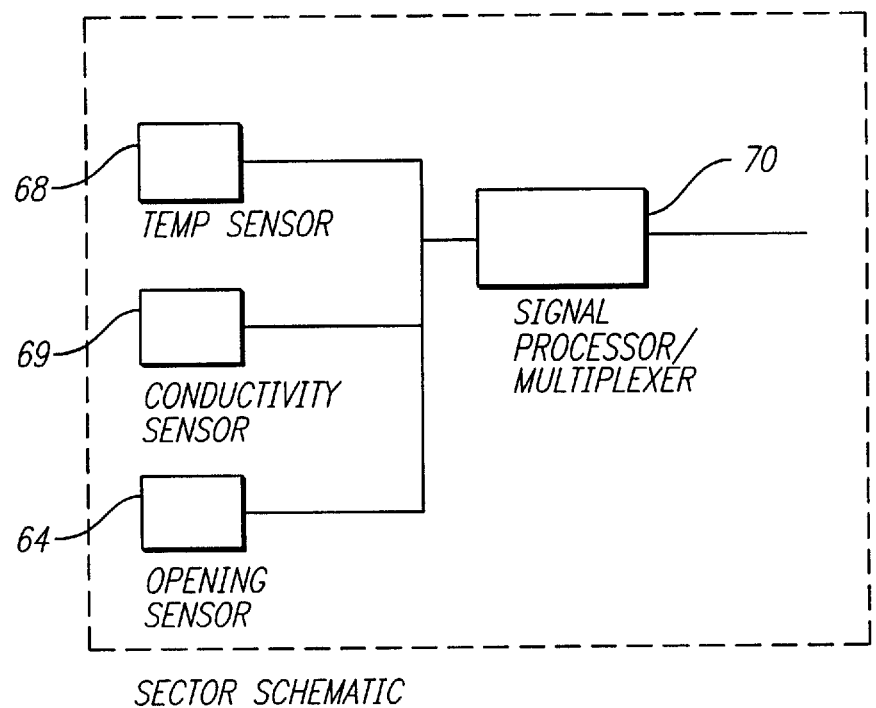
FIG. 8. is a block diagram of the surface sensors.

FIG. 8—Block Diagram of Sector Sensor—Description

FIG. 8 is a block diagram of the sector sensor. Signal processor/multiplexer 70 is connected to temperature sensor 68, conductivity sensor 69, and opening sensor 64.

Each sector, representing one portion of a roof or vertical wall, contains one conductivity sensor 69, one temperature sensor 68, and optionally, one opening sensor 64.

FIG. 8—Block Diagram of Control System—Operation

Conductivity sensor 69 senses the degree of fluid evaporation/absorption of roof 11. Upon reaching a pre-set degree of elimination of previously applied fluid, typically 4,00 to 5,000 ohms, conductivity sensor 69 sends a positive signal to signal conditioner/multiplexer 70.

Temperature sensor 68 senses the temperature of the upper surface of roof 11. Upon reaching a pre-set temperature, temperature sensor 68 sends a positive signal to signal conditioner/multiplexer 70.

Opening sensor 64 is used for vertical surfaces containing one or more openings such as windows. Upon sensing an open condition of an opening, opening sensor 64 sends a positive signal to signal conditioner/multiplexer 70. Signal conditioner/multiplexer sends a composite signal, comprising the outputs of conductivity sensor 69, temperature sensor 68, and opening sensor 64, to microprocessor 66.

Figure 9:
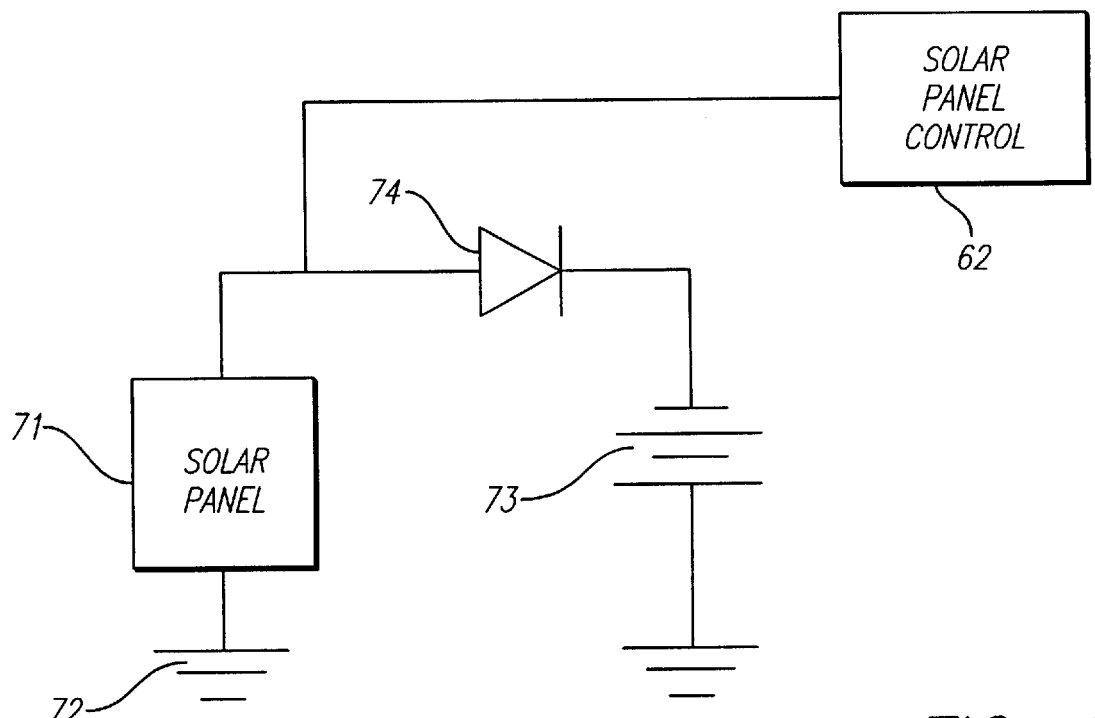
FIG. 9. is a block diagram of the system power supply.

FIG. 9—Block Diagram of Power System—Description

FIG. 9 is a block diagram of the power system for the control system. Battery 73 comprises the primary power source for operating all components of the control system. Connected to battery 73 is diode 74. Diode 74 is connected to solar panel 71. Solar panel 71 is connected to system battery 73 and system signal ground 72. Ground 72 is common to all circuitry for the system. Solar panel 71 also connects to solar panel control 62. Both solar panel 71 and battery 73 are joined at system ground 72. Diode 74 is connected between solar panel 71 and battery 73.

FIG. 9—Block Diagram of Power System—Operation

Battery 73 supplies all power for the system, and is recharged at all times sun available by solar panel 71. Diode 74 prevents discharge of battery 73 during periods when solar panel 71 is not generating power.

Figure 10:
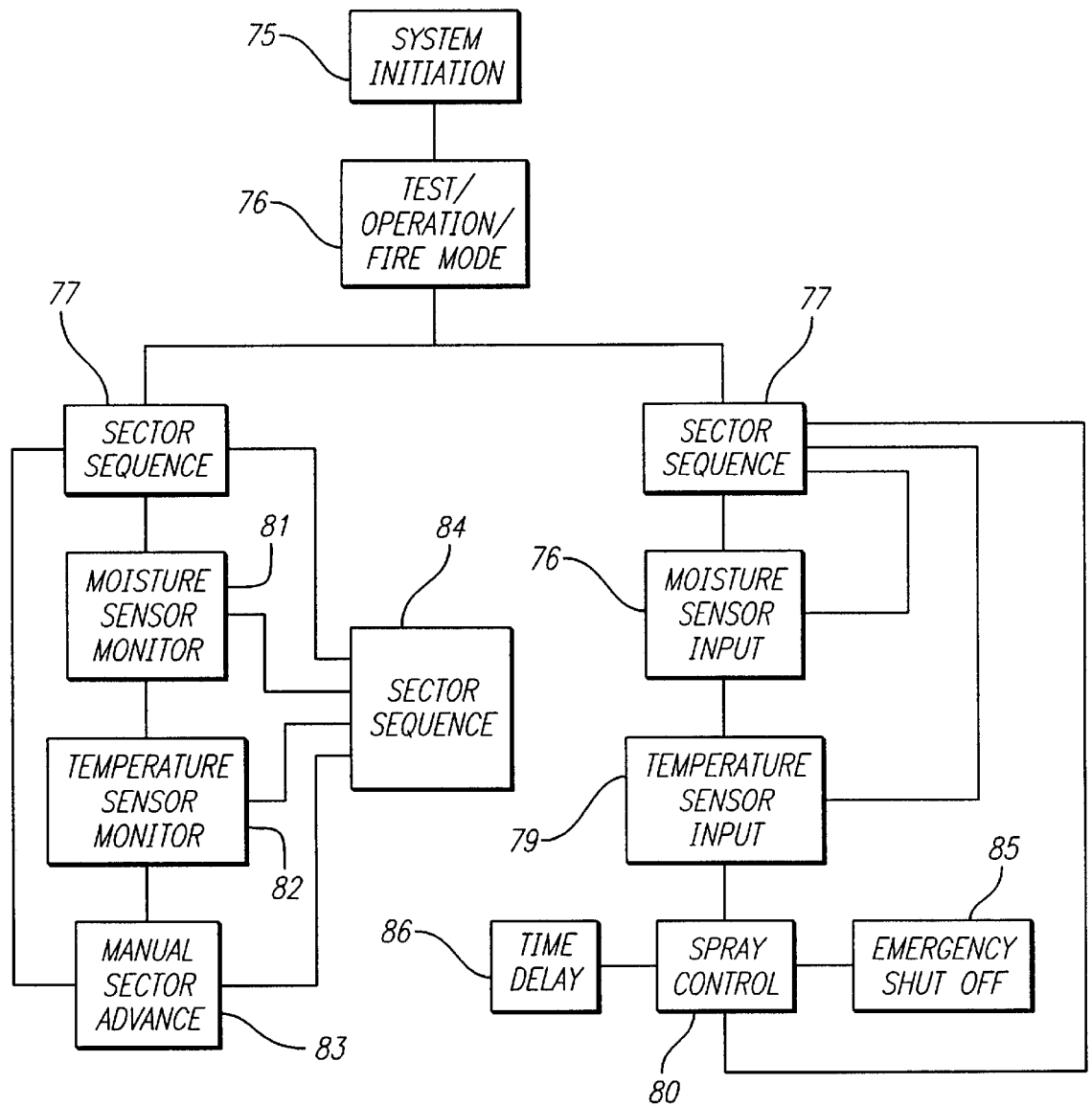
FIG. 10. is a flow chart of the control system software.

FIG. 10—Flow Chart of Control System Software—Description

FIG. 10 is a block diagram of the control system software. The software begins with system initiation 75, then proceeds to test/operate/fire mode select 76. In operate mode, the software selects a sector 77, senses moisture inputs 78, if required, senses temperature inputs 79, then controls spray output 80. Spray Control 80 connects to Emergency Shut Off 85, and time delay 86.

In test mode, the software selects a sector 77, senses moisture sensor inputs 81, senses temperature inputs 82, then allows a manual step in sector 83. All functions and outputs are displayed on display 84.

FIG. 10—Flow Chart of Control System Software—Operation

The control system software, upon application of power, initiates system block 75 by setting initial parameters, defining appropriate variables and constants, and allocating memory for the variables. After initiation, the software looks to an input 76 to determine if the system is to be placed in a test mode, standard operating or emergency fire mode. The system can begin its initiation upon application of power to the microprocessor, or upon reset of the microprocessor.

If placed in operate mode by test/operate/fire input 76, the system sets Sector One active by sector sequence 77. The system then looks at moisture sensor input 78 of Sector One to determine if Sector One has completed evaporation of any previously applied fluid. If used, the system then looks to temperature sensor input 79 of Sector One. This input determines if that sector has exceeded a preset trigger temperature, typically between 30 and 34.44 degrees Celsius. The inputs—moisture sensor input 78 and temperature sensor input 79—determine if the control valve associated with Sector One is to be energized.

If energized, control valve 18 for Sector One is held in on, or fluid-passing state for a period of time determined by delay 86. Typically, if the sector requires fluid, this delay will be set at between 15 and 25 seconds. At the end of delay 86, the active sector is advanced to the next sector, and the software returns to sector sequence for continuation of the program.

If test/operate/fire input 76 detects an input set for test mode, the software follows the following sequence;

As with operate mode, the software selects the first sector, Sector One. The sector being monitored is displayed on display 84. Moisture sensor input 81 monitors the sensor input, directing the results of the input to display 84. Temperature sensor input 82 monitors the input of the temperature sensor, and displays the results on display 84. During this time, a technician can adjust the sensors, valves, or other components associated with this active sector. When any adjustments are completed, the technician can input to the system a request to step to the next sector by manual sector advance 83. The system software now returns to sector sequence 77 for a repeat of all functions, with the next active sector.

If test/operate/fire input 76 detects an input set for fire mode, the system operates substantially the same as for operate mode, except the time delay between sectors, instead of being switch selectable, is set at a short timer interval—such as 20 seconds—to apply as evenly distributed application of water over the entire surface area as possible.

Additional Features and Functions of System

The present system corrects several failings of prior-art systems. Previously, systems assumed that all of the sun's energy was directed at the roof of a structure. The present system recognizes that additional energy is directed at vertical walls, especially those generally facing East or West, into the rising or setting sun.

Further, the present system corrects a long standing misconception of the application of a thin film of water to a structure. In all previous systems, timed sequences were thought to provide the correct amount of water for optimal cooling. This assumption is incorrect. It is necessary to allow for variations in materials, humidity, wind and other natural factors that impact the rate of evaporation. All of these factors, both natural and material oriented, are accounted for by measurement of the moisture content of the roof or wall before application of more water. The present system therefore affords the benefit of providing very efficient cooling for a structure at the least possible expenditure of water, an increasingly scarce commodity.

Having recognized the need to account for vertically applied solar energy, the present system then provides the feature of sensing any openings or breaches to vertical surfaces, such as an open window, and prevents the application of water such that damage might occur to interior objects.

The application of water to the roof of a building efficiently removes heat energy when the fluid is applied in a thin film. If, due to a mal-function of the system, the fluid is applied for an extended period of time, fluid can accumulate on a horizontal surface. This accumulation reduces the efficiency of the system, and can also damage the horizontal surface. The system therefore includes a timer circuit to monitor the maximum time any control valve is in the "on" state. If any valve remains on for a time in excess of the preset allowable time, the system is deactivated.

While dissipating solar energy by evaporation, the present system utilizes a portion of this energy by means of a solar panel, thereby eliminating the costly need for connection to the building electrical system.

CONCLUSIONS, RAMIFICATIONS, AND SCOPE

Accordingly, it can be seen that the various embodiments as set forth here provide an apparatus which removes solar energy from both the roof and energy impacted walls of a structure so as to provide a highly efficient cooling system. The present system corrects the results of long-standing erroneous assumptions by accounting for natural and material-based factors in the application of a thin film of water upon the desired surface, thereby achieving a degree of efficiency not possible under prior art systems. By use of control valves designed for operation at minimum power inputs, plus the use of a battery/solar panel combination to power the system without connection to power mains, considerable savings can be seen in reduced wiring and installation costs.

Consequently, this system affords the efficient use of evaporating fluids to cool a structure without wasting fluid due to excessive or overlapping application of the fluid, and use of solar energy to provide the electrical energy to operate the system.

While the above description is directed to specific embodiments, numerous variations are possible.

The system may be configured with a single valve, a single spray head and a single moisture/temperature sensor. With multiples of each of these components, the system can cover a substantially greater surface without increase in the size of the supply pipes.

The system may be configured to operate with only a moisture sensor for each sector the moisture sensor detecting the point at which a preponderance of the fluid has evaporated. The system will operate with convention al water control valves, at the expense of requiring a larger source of power. Square pattern spray heads reduce the overspray between spray heads. However, the system will operate, albeit with reduced efficiency, with conventional spray heads.

The system may be configured with a solar panel to recharge a rechargeable battery, thereby eliminating a need to connect the system to building power. The system will operate as intended with connection to any power source other than a solar panel-battery combination.

The system may be configured with various types and kinds of means of measuring methods so as to gather a respectable average value for the conductivity of the area under measurement. Measurement of the moisture-retention of roof type materials is at best an approximation. Roof materials, inherently, are insulators; that is they do not conduct electrical currents. Moisture generally does not evenly disburse among the particles of the material, yielding a uniform increase in conductivity of the material. Two probes, set a distance apart, may read inaccurately the moisture retention if the probes are placed in a local hollow area where fluid may accumulate to a greater degree than across the average of the roof. Droplets of fluid, forcibly ejected from a spray head, will generally disburse in a macroscopically even pattern. However, since any moisture measuring device will, by necessity, only measure a small portion of the area under consideration, t must be considered that the sensor might fall within an area not covered with droplets as the area as a whole.

Instead of measuring the conductivity of the surface, the retained moisture may be measured by measuring the reflective properties of the surface.

The system may be configured to cool other surfaces or areas than those surrounding a building. It is common to water a lawn or garden by applying water through a pipe and spray array as described in this system. Whether controlled manually, or by a timer attached to electrically valves, present lawn/garden watering systems would be greatly enhanced by the use of the moisture measuring-water application of this system. The benefit of the use of the system for lawns and gardens would be the reduction of excessive water applied beyond that needed to maintain the life and beauty of the foliage.

Accordingly, the scope of this invention should be defined by the scope of the following claims and their legal equivalents, and not by the specific embodiments described.

What is claimed is:

1. An efficient structure cooling system for cooling a building, comprising;
    (a) a plurality of spray nozzles arranged to spray a corresponding plurality of respective areas of the outside of a building, respectively;
    (b) conduit means for supplying said plurality of spray nozzles with fluid;
    (c) a plurality of control valve means in communication with said conduit means;
    (d) a plurality of moisture-retention measurement means;
    (e) a control system means in communication with said moisture retention measurement means, said control valve means, and a power source means;
    (f) said control system means being arranged to sense the condition of solar impacted areas of said building and operating said control valve means to apply said fluid to the areas of the outside of said building whose condition exceeds a predetermined value, whereby said fluid will be applied as necessary for maximum evaporative effect.

2. The efficient structure cooling system of claim 1 wherein said control system means is arranged to energize said plurality of said control valve means in sequence.

3. The efficient structure cooling system of claim 1 wherein a sub-plurality of said spray nozzles are respectively associated with said plurality of said control valve means.

4. The efficient structure cooling system of claim 1 wherein a plurality of vertical planes of said building are respectively associated with a sub-plurality of said spray nozzles.

5. The efficient structure cooling system of claim 1 wherein said building has a plurality of vertical planes and at least one of said control valve means are associated with at least one of said vertical planes.

6. The efficient structure cooling system of claim 1 further including open window detection means for communicating with said control system means to prevent application of fluid into an area of said building with an open window.

7. The efficient structure cooling system of claim 1 wherein said power source is a battery.

8. The efficient structure cooling system of claim 7 further including a solar energy conversion means for charging said battery.

9. The efficient structure cooling system of claim 1 wherein said control system enables said control valve means to be manually operated.

10. The efficient structure cooling system of claim 1 further including moisture retention measurement means for measuring surface conductivity for controlling application of said fluid.

11. The efficient structure cooling system of claim 1 further including means for applying said control valve means a momentary application of power to provide application of fluid.

12. The efficient structure cooling system of claim 1 wherein said spray nozzles are each arranged to produce a square pattern of spray.

13. The efficient structure cooling system of claim 1 wherein said conduit means are coated to provide protection from infrared radiation.

14. The efficient structure cooling system of claim 1 wherein said plurality of moisture retention measurement means is arranged to measure surface water reflection.

15. The efficient structure cooling system of claim 1 further including means for draining said system to prevent freezing of pipes.

16. The efficient structure cooling system means of claim 1 wherein said control system is arranged to control application of said fluid by measuring and responding to surface temperatures.

17. The efficient structure cooling system of claim 1 further including a water softener in communication with water supply pipes for reducing deposit of minerals and water impurities on structure surfaces.

18. The efficient structure cooling system of claim 1 further including a fluid flow meter in communication with said system for measuring fluid quantity and fluid flow rate.

19. The efficient structure cooling system of claim 1 wherein a solar panel in communication with said control means is arranged to place said control system in low power mode during periods of reduced solar energy generation.

20. A method of cooling a structure by removing solar energy at its area of impingement on said structure, comprising;
   (a) a means for spraying a fluid on a structure,
   (b) a means for conducting said fluid to said spray means;
   (c) a means for measuring the rate of evaporation of said fluid; and
   (d) a means for controlling application of said fluid in proportion to said evaporation rate of said fluid.

21. The method of cooling a structure of claim 20 wherein said means for measuring said rate of evaporation of said fluid is arranged to measure surface conductivity of an area on a surface of said structure.

22. The method of cooling a structure of claim 20 wherein said means for measuring said rate of evaporation of said fluid is arranged to additionally measure absorption of said fluid by said surface.

23. The method of cooling a structure of claim 20 wherein said spray means are in communication with a plurality of vertical planes associated with said structure.

24. The method of cooling a structure of claim 20 further including means for restricting said spray means from applying said fluid to areas containing openings.

25. An efficient cooling system for cooling a building, comprising;
   (a) a plurality of spray nozzles;
   (b) a conduit for supplying said plurality of spray nozzles with fluid;
   (c) a plurality of control valves in communication with said conduit;
   (d) a plurality of moisture retention measurement circuits;
   (e) a control system in communication with said moisture retention measurement circuits, said control valves, and a power source;
   (f) said control system being arranged to sense the condition of solar impacted areas of said building and operating said control valves to apply said fluid to the areas of the outside of said building whose condition exceeds a predetermined value, whereby said fluid will be applied as necessary for maximum evaporative effect.

26. The efficient structure cooling system of claim 25 wherein said control system is arranged to energize said plurality of said control valves in sequence.

27. The efficient structure cooling system of claim 25 wherein a sub-plurality of said spray nozzles are respectively associated with said plurality of said control valves.

28. The efficient structure cooling system of claim 25 wherein a plurality of vertical planes of said building are respectively associated with a sub-plurality of said spray nozzles.

29. The efficient structure cooling system of claim 25 wherein said building has a plurality of vertical planes and at least one of said control valves are associated with said vertical planes.

30. The efficient structure cooling system of claim 25 further including open window detection for communicating with said control system to prevent application of fluid into surface openings.

31. The efficient structure cooling system of claim 25 wherein said power source is a battery.

32. The efficient structure cooling system of claim 25 further including a solar energy conversion device for charging said battery.

33. The efficient structure cooling system of claim 25 wherein said control system enables said control valves to be manually operated.

34. The efficient structure cooling system of claim 25 further including a moisture retention measurement device for measuring surface conductivity for controlling application of said fluid.

35. The efficient structure cooling system of claim 25 wherein said control valves require a momentary application of power to provide application of fluid.

36. The efficient structure cooling system of claim 25 wherein said spray nozzles are arranged to produce a square pattern of spray.

37. The efficient structure cooling system of claim 25 where in s aid conduit is coated to provide protection from infrared radiation.

38. The efficient structure cooling system of claim 25 wherein said plurality of moisture retention measurement devices are arranged to measure surface water reflection.

39. The efficient structure cooling system of claim 25 further including a valve to drain said system to prevent freezing of pipes.

40. The efficient structure cooling system of claim 25 wherein said control system is arranged to control application of said fluid by measuring and responding to surface temperatures.

41. The efficient structure cooling system of claim 25 further including a water softener in communication with said pipes for reducing deposit of minerals and water impurities on structure surfaces.

42. The efficient structure cooling system of claim 25 further including a fluid flow meter in communication with said system for measuring fluid quantity and fluid flow rate.

43. The efficient structure cooling system of claim 25 wherein said solar panel in communication with said control system is arranged to place said control system in low power mode during periods of reduced solar energy generation.

44. The efficient structure cooling system of claim 25 wherein said control system measures the time each of a plurality of said control valves is in the on state, shutting down said control system power if a maximum time is exceeded.

45. The efficient structure cooling system of claim 25 wherein said control system includes an emergency operating mode which continuously applies fluid to said surfaces until said emergency operating mode is de-activated.

* * * * *